Dec. 4, 1923.

A. J. BORST, JR

MOTOR VEHICLE

Filed June 19, 1919

1,476,355

Witness:
Jacob Obrst, Jr.

Andrew J. Borst, Jr. Inventor.
By Emil Neuhart
Attorney.

Patented Dec. 4, 1923.

1,476,355

UNITED STATES PATENT OFFICE.

ANDREW J. BORST, JR., OF BUFFALO, NEW YORK.

MOTOR VEHICLE.

Application filed June 19, 1919. Serial No. 305,288.

*To all whom it may concern:*

Be it known that I, ANDREW J. BORST, Jr., a citizen of the United States, residing at Buffalo, in the county of Erie and State of New York, have invented certain new and useful Improvements in Motor Vehicles, of which the following is a specification.

This invention relates to motor vehicles, and more particularly to the spring connections thereof whereby the vehicle springs are attached or connected to or operatively positioned with reference to other parts or members of the vehicle.

The primary object of my invention is the provision of yielding means interposed between the springs of a vehicle and other parts or members thereof with a view of imparting easier riding qualities to the vehicle, eliminating sudden jolts and jars which would otherwise be imparted from one part of the vehicle to another, thereby preventing crystallizing of the parts, rendering the springs more resilient, and minimizing the possibilities of the springs becoming broken.

A further object is to provide a cushioned combined spring and axle-bearing to which the medial portion of a vehicle spring is secured and in which the axle is journaled, and cushioned hangers to which opposite ends of the spring are secured.

With the above and other objects in view, the invention consists in the novel features of construction and in the arrangement and combination of parts hereinafter described and more particularly pointed out in the subjoined claims.

In the drawings:—

Figure 1:
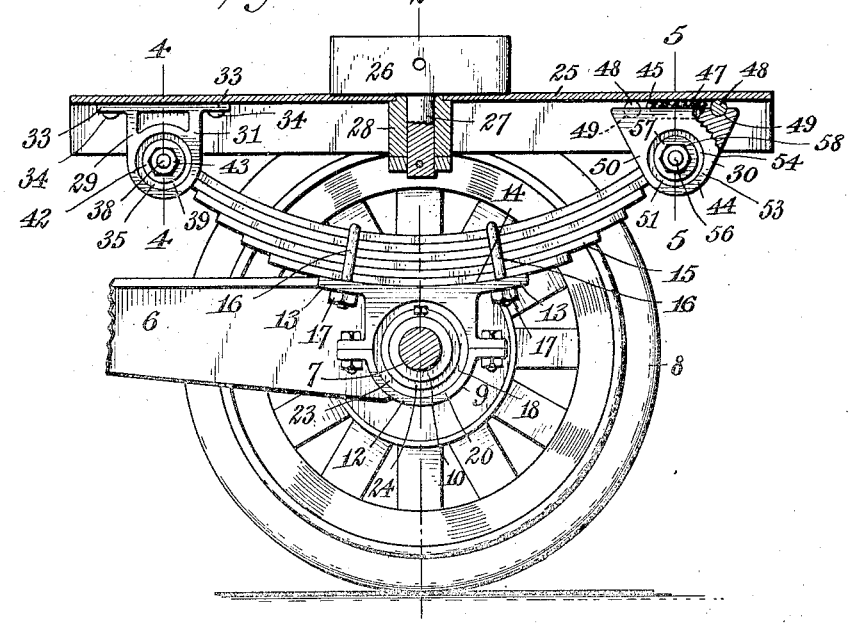
Fig. 1 is a longitudinal section through the rear end of a vehicle having a portion thereof spring-mounted and the springs thereof secured and connected to other parts or members of the vehicle in accordance with my invention.
Figure 3:
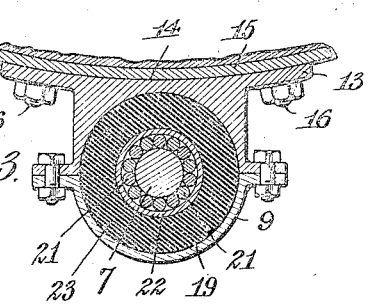
Fig. 3 is a cross section on an enlarged scale taken on line 3—3, Fig. 2.
Figure 2:
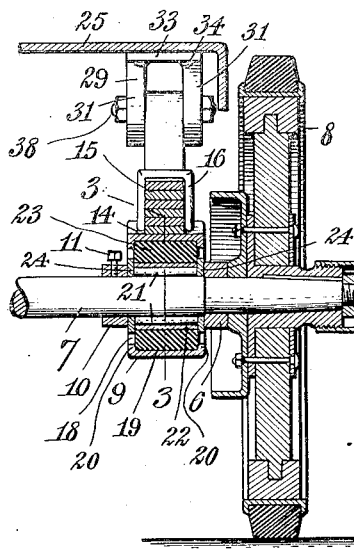
Fig. 2 is a transverse section through one side of the vehicle taken on line 2—2, Fig. 1.
Figure 4:
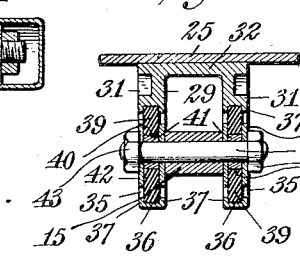
Fig. 4 is a transverse section on an enlarged scale taken on line 4—4, Fig. 1.
Figure 5:
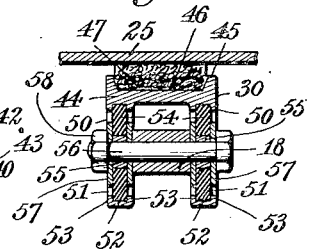
Fig. 5 is a transverse section on an enlarged scale taken on line 5—5, Fig. 1.

In the drawings I have illustrated my invention in connection with the rear end of a tractor adapted to have a semi-trailer attached thereto, and while the invention is particularly adapted for spring-mounting the supporting platform of the tractor to which the front end of a semi-trailer is to be swiveled, it will be apparent from the description to follow that the invention may be used for securing or connecting vehicle springs and mounting axles on any type of vehicle.

In the drawings, 6 designates the chassis or frame of a vehicle in which is suitably mounted for rotation the axle 7 having the traction wheels 8 secured thereto in any approved manner, one only of which is shown in the drawings. It is of course to be understood that the axle may be continuous from end to end and the traction wheels rotatably mounted thereon, or it may be any other type of axle, for instance a divided axle with the usual differential gearing between the two parts thereof. For this reason I deem it unnecessary to illustrate more than one end of one common type of axle.

The representative axle shown is rotatably mounted in a combined spring and axle bearing 9 arranged adjacent the chassis or frame of the vehicle and held from lengthwise movement by means of a collar 10 fastened to the axle by means of a set screw 11 or applied in any other approved manner. The particular means provided for securing or retaining the bearing 9 in position I do not consider of importance, as this may be varied to suit the type of chassis or frame, or the type of vehicle without departing from the scope of my invention.

The combined spring and axle bearing comprises a housing 12 having suitable flanges 13, the spring bearing surface 14 of the housing being preferably concaved to conform to the curvature of the spring 15 mounted thereon. Said spring is preferably of semi-elliptic formation and consists of a series of leaves connected together by means of U-shaped bolts or clips 16, or otherwise. In the drawings I have shown the U-shaped bolts or clips 16 passed over the series of spring leaves from the top so as to embrace the same, with the opposite ends of the bolts or clips passed through the flanges 13 of the bearing. Nuts 17 are secured to the ends of said bolts and securely fasten the spring to the securing member. The housing 12 is provided with a cylindrical opening 18 enlarged in diameter between the opposite sides thereof so as to form an annular depression 19 and two retainer flanges 20 at opposite sides thereof.

Surrounding the axle is a series of antifriction rollers 21 around which is arranged a metallic sleeve 22 forming one part of the raceway for said rollers, the other part of the raceway being formed by the axle, but it will be apparent from the stated objects of this invention that this construction may be modified without departing from the principle involved, as the sole purpose thereof is to provide an anti-friction bearing for the axle within the bearing member 9.

Within the depression 19 of the housing 12 and surrounding the metallic sleeve or outer raceway of the roller bearing is a yielding element or cushion in the form of a rubber ring or annulus 23, the outer marginal portion of which lies in contact with the retainer flanges 20 of the housing, and at the inner marginal portion thereof, as well as the opposite edges of the metallic sleeve 22 and opposite ends of the anti-friction rollers 21, washers or retainers 24 are arranged; these washers or retainers having, respectively, their outer sides in contact with the chassis or frame of the vehicle and with the collar 10. In this manner the spring is securely fastened to the bearing member 9 and said member yieldingly mounted so that sudden jars imparted to the vehicle by reason of the wheels thereof striking obstructions or traveling over rough surfaces is partly absorbed before being imparted to the springs or other parts of the vehicle, thereby preventing crystallization of such parts.

As hereinbefore stated, the invention is particularly adapted for use in connection with supporting platforms of tractors on which the front ends of semi-trailers are adapted to be attached, and in the illustration shown, 25 designates the supporting platform, which is itself supported by means of the semi-elliptic springs 15. Mounted on said platform is a coupling head 26 having a depending pivot-pin 27 passing through a bearing 28 forming part of said platform. The coupling head is therefore permitted to rotate and is arranged to be coupled to a part of a semi-trailer so that the tractor may change its course with reference to the trailer and cause the trailer to follow the tractor in its course.

Secured to the under side of the platform 25 which, in a broad sense, may be considered the vehicle body, are hangers 29, one of which only is shown at one side of the platfrom, but it is of course understood that this is duplicated at the other side for the opposite spring (not shown). To these hangers one end of each of the springs, preferably the front end, is secured and fastened to the opposite end of each of the springs, is a loose or floating hanger or bearing member 30, against which the under side of the supporting platform bears. It is of course understood that when the weight imposed upon the platform is increased, the semi-elliptical springs 15 have the ends thereof depressed so that they assume a curvature of greater radius. This causes the opposite ends of the spring to be separated and one end must necessarily yield to prevent binding and possible breakage of the springs.

Each of the hangers 29 is provided with two spaced depending portions 31 connected at the top by a web 32 projecting rearwardly and forwardly from the front and rear edges of the depending portions to form securing lugs 33 through which rivets or other securing means 34 are passed that are fastened into the platform. Each of the depending portions 31 has a cylindrical opening 35 therethrough, and the cylindrical openings of both depending portions are alined. Each of the cylindrical openings is enlarged between its ends to form an annular depression 36 and retainer flanges 37. Into the space between the two depending portions of the hanger one end of the upper or innermost leaf of the vehicle spring extends, and this end is fashioned into the form of an eye to provide a bolt hole through which a bolt 38 is passed.

Arranged within each of the annular depressions of the depending portions 31 of each hanger 29 is a yielding member or cushion in the form of a rubber ring 39 or the like having an axial opening 40, and in each of these axial openings a metallic bushing 41 is fitted. Metallic washers or retainer members 42 of larger diameter than the bushings are arranged at opposite sides of the yielding member or cushion and bear against opposite ends of the metallic bushings and opposite sides of said yielding member or cushion. These washers or retainer members and each of the bushings have axial openings to receive the bolt 38 which is of a length to extend outwardly beyond opposite sides of the hanger and it has nuts 43 applied to opposite ends which bear against the outer faces of the outer washer or retainer member of each depending portion 31. The eye of the spring has opposite ends thereof in contact with the inner faces of the inner washers or retainer members, and in this manner one end of the spring is yieldingly secured to the supporting platform, or in the case of an ordinary vehicle to the vehicle body.

At the other end of each of the springs 15, the floating hanger or securing member 30 comprises a body portion 44 having a flat upper side or surface 45 with a central depression 46 in which absorbent material 47 is placed, which material bears against the under side of the platform, and spaced from said absorbent material at the rear and front of the hanger or bearing member are anti-friction rollers 48 which are rotatably seated within semi-cylindrical depressions 49 formed in the upper face of said member. As the spring is depressed, said hanger or bearing member is moved back and forth underneath the supporting platform with the absorbent material 47 in rubbing contact so as to lubricate the region thereof against which the anti-friction rollers 48 rotate, thus rendering the device free in action and eliminating all noise. The floating hangers, like the hangers 29 at the opposite ends of the springs, are each provided with two spaced depending portions 50, each having a cylindrical opening 51 with an annular depression 52 and retainer flanges 53. Within each of the depressions is a yielding member or cushion 54 having an axial opening into which is fitted a metallic bushing 55. The opposite end of each spring is also provided with a bolt hole and it is placed between the depending portions of the floating hanger. A securing bolt 56 is passed through said bolt hole and the metallic bushings 55 with metallic washers or retainer members 57 bearing against the outer and inner faces of each yielding member or cushion and the ends of the bushings inserted in said yielding members or cushions. The washer or retainer member at the inner sides of each depending portion is in contact with the end portion of the spring and one of the outer washers or retaining members has the head of the bolt 56 bearing thereagainst, while the other outer washer or retainer member has a nut 58 bearing thereagainst which is threaded onto said bolt.

It is therefore apparent that the manner of connecting the springs to the rear or floating hangers 30 is similar to that of the front or rigidly secured hangers 29 with these hangers different only in construction at the upper ends thereof, the hangers at one end of the springs having means for permanently securing them to the supporting platform or the body of a vehicle, as the case may be, while the others have means which allow them to move lengthwise in contact with the under sides of the platform or the body of a vehicle, as the case may be, while retaining their proper positions with respect to the springs attached thereto. In each case, however, the securing bolt connecting one end of a spring to the hanger is yieldingly supported and the means for yieldingly supporting the same, which may be termed a metal lined cushion, is retained within the hanger, the whole being arranged to permit radial movement of the securing bolt within the hanger or connection in any direction or angle so that the initial shocks or jars to which the connections are subjected are absorbed by the cushions or yielding members and the body of the vehicle relieved of considerable strain and wear.

It is apparent from the foregoing that each bearing for the axle is directly beneath a spring, forming both a combined axle and spring-bearing, which is fastened directly to the spring, the axle shown being what is generally termed a "live" axle to which the initial driving power is imparted from the engine so that with this axle thus journaled and provided with cushioned roller bearings the sudden jolts imparted to the vehicle body upon starting, or when quickly stopping, are almost eliminated, as the shock or jar is absorbed by the cushion bearing before it has an opportunity to be imparted to the springs or body mounted on the springs.

Where in the claims the word "connection" or "connector" is employed, it is intended to mean any device or fitting by means of which one part of a vehicle is connected to another, or by means of which one part of a vehicle is journaled and receives support from another, and in its broadest sense includes both a bearing and a hanger, as illustrated in the drawings, or any similar device or fitting.

Having thus described my invention, what I claim is:—

1. The combination with a vehicle body and a vehicle spring having a bolt hole at one end, of a hanger in contact with said vehicle body having two spaced depending portions, alined openings in said hanger, each opening having an annular depression providing opposite retainer flanges, a rubber cushion within each of said depressions with said retainer flanges bearing against opposite sides of said cushion, a metallic bushing in said cushion, and a bolt passing through said metallic bushings and the bolt hole of said spring.

2. The combination with a vehicle body and a spring having one end thereof provided with a bolt hole, of a metallic member between said vehicle body and said end of said spring, said metallic member having two spaced depending portions provided with alined openings and an annular depression in each opening providing retainer flanges at opposite ends thereof, a cushion fitted within each depression, a metallic bushing within each cushion, said end of said spring being arranged between said depending portions, a washer bearing against the inner face of each yielding member and the inner end of the metallic bushing therein, a washer bearing against the outer face of each yielding member and the outer end of the bushing therein, and a bolt passing through said bushings and washers and through the bolt hole of said spring.

3. The combination with a vehicle body and a vehicle spring, of a metallic member between said body and spring and being secured to said spring, said metallic member having one surface thereof spaced from the body portion with a depression therein, absorbent material within said depression adapted to be lubricated and bear against said body, said surface having semi-cylindrical depressions in rear and in front of the first-mentioned depression, and anti-friction rollers within each of said semi-cylindrical depressions in contact with the vehicle body.

In testimony whereof I affix my signature.

ANDREW J. BORST, JR.